United States Patent [19]

Baardman et al.

[11] Patent Number: 5,658,982

[45] Date of Patent: *Aug. 19, 1997

[54] PROCESS FOR THE COPOLYMERIZATION OF CARBON MONOXIDE WITH AN OLEFINICALLY UNSATURATED COMPOUND

[75] Inventors: Frank Baardman; Arleen Marie Bradford; Jayne Jubb; Pieter Scheerman; Rudolf Jacobus Wijngaarden, all of Amsterdam, Netherlands

[73] Assignee: Shell Oil Company, Houston, Tex.

[*] Notice: The portion of the term of this patent subsequent to Mar. 13, 2016, has been disclaimed.

[21] Appl. No.: 614,287

[22] Filed: Mar. 12, 1996

[30] Foreign Application Priority Data

Mar. 22, 1995 [EP] European Pat. Off. .............. 95200716

[51] Int. Cl.⁶ ...................................... C08K 5/49
[52] U.S. Cl. ..................... 524/711; 528/220; 528/225; 528/392; 524/709; 524/779; 524/846
[58] Field of Search ........................ 528/392, 220, 528/225; 524/709, 711, 779, 846

[56] References Cited

U.S. PATENT DOCUMENTS 5,175,244 12/1992 Budzelaar et al. .
5,434,243 7/1995 Mastenbroek et al. ............. 528/392
5,440,010 8/1995 Cheron et al. ...................... 528/392

FOREIGN PATENT DOCUMENTS

| 336459 | 2/1989 | European Pat. Off. . |
| 619335 | 3/1994 | European Pat. Off. . |
| 650761 | 10/1994 | European Pat. Off. . |

*Primary Examiner*—Samuel A. Acquah

[57] ABSTRACT

A process for the copolymerization of carbon monoxide with an olefinically unsaturated in which the monomers are contacted with a catalyst composition which is based on a source of a Group VIII metal and a boron hydrocarbyl compound. Additional boron hydrocarbyl compound is added to the polymerization mixture during the copolymerization or when the catalyst has lost its activity. A process for recycling a polymerization catalyst is also presented. It includes the steps of recovering a Group VIII metal composition from a preceding copolymerization process for the preparation of a copolymer of carbon monoxide and an olefinically unsaturated compound and adding a boron hydrocarbyl compound to the Group VIII metal composition.

13 Claims, No Drawings

PROCESS FOR THE COPOLYMERIZATION OF CARBON MONOXIDE WITH AN OLEFINICALLY UNSATURATED COMPOUND

FIELD OF THE INVENTION

This invention relates to a process for the copolymerization of carbon monoxide with an olefinically unsaturated compound.

BACKGROUND OF THE INVENTION

EP-A-619335 proposes a process for the copolymerization of carbon monoxide with an olefinically unsaturated compound which comprises contacting the monomers with a catalyst composition based on a Group VIII metal and a boron hydrocarbyl compound. This process is suitable for preparing linear alternating copolymers of carbon monoxide with an olefinically unsaturated compound.

Unfortunately, a rapid decay of the polymerization rate and deactivation of the catalyst can occur in this process. Within an hour the rate of polymerization has been seen to become unattractively low, such that residence times in excess of one hour do not contribute in a meaningful way to the economy of the process.

It has now unexpectedly been found that the catalyst activity can be maintained or restored by supplying additional boron hydrocarbyl compound during copolymerization.

SUMMARY OF THE INVENTION

The present invention therefore relates to a process for the copolymerization of carbon monoxide with an olefinically unsaturated compound comprising contacting the monomers with a catalyst composition which is based on a source of a Group VIII metal and a boron hydrocarbyl compound and adding additional boron hydrocarbyl compound to the polymerization mixture during the copolymerization or when the catalyst has lost its activity.

Because of the improved stability of the polymerization rate residence times exceeding 1 hour, in particular exceeding 1.5 hours, can be applied in a meaningful way. The invented process also allows for the preparation of a larger quantity of copolymer relative to the quantity of Group VIII metal employed.

DETAILED DISCUSSION OF THE INVENTION

Compared with the copolymerization process of EP-A-619335, the invented process allows for the preparation of a larger quantity of copolymer relatively to the quantity of Group VIII metal employed. Thus, besides being attractive from an economic point of view, the invented process is also attractive in that the quantity of remnants of Group VIII metal component in the prepared polymer can be lower, which is generally beneficial to polymer properties such as the melt stability.

In the present specification and claims the term "Group VIII metal" encompasses the noble metals ruthenium, rhodium, palladium, osmium, iridium and platinum, and the iron group metals iron, cobalt and nickel.

The catalyst composition suitable for use in the process of the invention is based on a source of cations of the metal(s). Suitable sources of cations of metals of Group VIII include salts of mineral acids, such as salts of sulphuric acid, nitric acid and phosphoric acid, and salts of sulphonic acids, such as methanesulphonic acid and paratoluenesulphonic acid. Preferred sources are salts of carboxylic acids, in particular those having up to 6 carbon atoms, such as acetic acid, propionic acid and trifluoroacetic acid. If desired, as cation source use may be made of the metals in their elemental form, or in a zero-valent state thereof, e.g. in complex form, such as complexes wherein the Group VIII metal is covalently bonded to one or two hydrocarbyl groups. These covalently bonded hydrocarbyl groups may be aliphatic or aromatic and contain typically up to 12 carbon atoms. Preferred covalently bonded hydrocarbyl groups are aliphatic groups, in particular n-alkyl groups, such as methyl and n-butyl groups.

Catalyst compositions based on a noble Group VIII metal are preferred, those based on palladium being most preferred. A preferred source of palladium is palladium (II) acetate.

In addition to a Group VIII metal the catalyst composition contains a boron hydrocarbyl compound. The boron hydrocarbyl compound is typically a hydrocarbylborane of the general formula BXYZ wherein X, Y and Z denote independently a substituted or unsubstituted hydrocarbyl group, a hydroxy group, a substituted or unsubstituted hydrocarbyloxy group or a halogen atom, on the understanding that at least one of X, Y and Z denotes a substituted or unsubstituted hydrocarbyl group. The hydrocarbyl groups and the hydrocarbyl groups of the hydrocarbyloxy groups may be aliphatic or aromatic groups, such groups typically having up to 12 carbon atoms. Preferred hydrocarbyl groups are aryl groups which may or may not be substituted. Preferred substituents of the hydrocarbyl groups are electron withdrawing groups or atoms, such as trihalomethyl groups, nitro groups and halogen atoms. Hydrocarbyl groups of which all hydrogen atoms are replaced by substituents are included in the term "hydrocarbyl group". Preferred hydrocarbyl groups are in particular phenyl groups, more particularly perfluorophenyl or 3,5-bis(trifluoromethyl)phenyl groups. Examples of suitable aliphatic groups are ethyl, n-butyl and n-hexyl groups. Halogen atoms X, Y or Z are preferably fluorine. Examples of hydrocarbylboranes are phenyldifluoroborane, phenylboronic acid and hexylboronic acid. It is preferred that all three groups X, Y and Z are hydrocarbyl groups. Preferred hydrocarbylboranes are triphenylborane, tris-(perfluorophenyl)borane and tris[3,5-bis(trifluoromethyl)phenyl]borane.

Other suitable boron hydrocarbyl compounds are salts containing one or more hydrocarbylborate anions per molecule, such as salts of the general formula $MeBZ^1Z^2Z^3Z^4$ wherein Me is a alkali metal, for example lithium or sodium, and $Z^1$, $Z^2$, $Z^3$ and $Z^4$ denote independently a substituted or unsubstituted hydrocarbyl group. The hydrocarbyl groups $Z^1$, $Z^2$, $Z^3$ and $Z^4$ may be of the same types and may be selected according to the same preferences as indicated above for the groups X, Y and Z. Examples are lithium tetraphenylborate and sodium tetrakis (perfluorophenyl)borate.

The total quantity of boron hydrocarbyl compound used in the process may be varied between wide limits. However, it is preferred to use the boron hydrocarbyl compound in a total quantity which is low relatively to the quantity of copolymer to be prepared. Suitably that quantity is less than 0.2 moles boron per kg of copolymer, preferably in the range of from 0.005–0.15 moles boron per kg copolymer. It is also preferred to use the boron hydrocarbyl compound in a quantity such that the molar ratio of boron to the Group VIII metal is less than 25. It is even more preferable that this ratio is in the range of 0.1–20, the range of 0.5–15, is more preferred yet, and in the range of 1–10 is most perferred.

In accordance with this invention a part of the boron hydrocarbyl compound is supplied during the copolymerization. Also a completely deactivated catalyst can be reactivated by supplying boron hydrocarbyl compound, so that it is also possible to supply additional boron hydrocarbyl compound after the polymerization rate has become nil. In either case, for example, 40% or less, preferably 5–30%, of the boron hydrocarbyl compound is supplied at the start of the polymerization and the remainder is supplied in a later stage, prior to work-up, in a continuous fashion or step wise.

The catalyst composition of the invented process is preferably based, as an additional component, on a ligand which forms a complex with the Group VIII metal. The presence of two complexing sites in one ligand molecule significantly contributes to the activity of the catalysts. It is thus preferred to use a ligand containing at least two dentate groups which can complex with the Group VIII metal. Although less preferred, it is also possible to employ a monodentate ligand, i.e. a compound which contains a single dentate group which can complex with the Group VIII metal. Suitably a bidentate ligand is used which contains two phosphorus-, nitrogen- or sulphur containing dentate groups. It is also possible to use a bidentate mixed ligand such as 1-diphenylphosphino-3-ethylthiopropane.

A preferred group of bidentate ligands can be indicated by the general formula

$$R^1R^2M^1\text{—}R\text{—}M^2R^3R^4 \qquad (I)$$

In this formula $M^1$ and $M^2$ independently represent a phosphorus, arsenic or antimony atom, $R^1$, $R^2$, $R^3$ and $R^4$ independently represent a non-substituted or polar substituted hydrocarbyl group, in particular of up to 10 carbon atoms, and R represents a bivalent organic bridging group containing at least 2 carbon atoms in the bridge.

In the ligands of formula (I) $M^1$ and $M^2$ preferably represent phosphorus atoms. $R^1$, $R^2$, $R^3$ and $R^4$ may independently represent optionally polar substituted alkyl, aryl, alkaryl, aralkyl or cycloalkyl groups. Preferably at least one of $R^1$, $R^2$, $R^3$ and $R^4$ represents an aromatic group, in particular an aromatic group which is polar substituted.

Suitable polar groups include halogen atoms, such as fluorine and chlorine, alkoxy groups such as methoxy and ethoxy groups and alkylamino groups such as methylamino-, dimethylamino- and diethylamino groups. Alkoxy groups and alkylamino groups contain in particular up to 5 carbon atoms in each of their alkyl groups.

It is preferred that one or more of $R^1$, $R^2$, $R^3$ and $R^4$ represents an aryl group, preferably a phenyl group, substituted at an ortho position with respect to $M^1$ or $M^2$ with an alkoxy group, especially a methoxy group. This provides advantageously a further improvement in maintaining the polymerization rate at the initial level, so that still more copolymer can be prepared using a certain quantity of the Group VIII metal catalyst. Such means which assist in stabilizing the polymerization rate, i.e. other than by supplying additional boron hydrocarbyl compound during the copolymerization, also provide an opportunity to reduce the molar ratio of boron to the Group VIII metal. This is advantageous from an economic point of view. However, it is also advantageous because it may further reduce the quantity of catalyst remnants in the copolymer prepared, i.e. remnants from the Group VIII metal and the boron hydrocarbyl compound.

In the ligands of formula (I), R preferably represents a bivalent organic bridging group containing from 2 to 4 bridging atoms, at least two of which are carbon atoms.

Examples of such groups R are —$CH_2$—$CH_2$—, —$CH_2$—$CH_2$—$CH_2$—, and —$CH_2$—$CH_2$—$CH_2$—$CH_2$—. Preferably R is a trimethylene group. Preferred ligands are 1,3-bis[bis(2,4-dimethoxyphenyl)phosphino]propane, 1,3-bis[bis(2,4,6-trimethoxyphenyl)phosphino]propane and, more preferred, 1,3-bis[bis(2-methoxyphenyl)phosphino]propane.

Other suitable bidentate ligands are nitrogen containing compounds of the general formula:

$$\qquad (II)$$

wherein $X^1$ and $X^2$ independently represent organic bridging groups each containing 3 or 4 atoms in the bridge at least 2 of which are carbon atoms. There may be an additional bridging group connecting the bridging groups $X^1$ and $X^2$. Examples of such compounds are 2,2'-bipyridine, 4,4'-dimethyl-2,2'-bipyridine, 4,4'-dimethoxy-2,2'-bipyridine, 1,10-phenanthroline, 4,7-diphenyl-1,10-phenanthroline and 4,7-dimethyl-1,10-phenanthroline. Preferred compounds are 2,2'-bipyridine and 1,10-phenanthroline.

Other suitable bidentate ligands are sulphur containing compounds of the general formula:

$$R^5S\text{—}Q\text{—}SR^6 \qquad (III)$$

wherein $R^5$ and $R^6$ independently represent a non-substituted or polar substituted hydrocarbyl group and Q represents a bivalent bridging group containing 2 to 4 carbon atoms in the bridge. The groups $R^5$ and $R^6$ are preferably alkyl groups, each having in particular up to 10 carbon atoms. Bis thio compounds such as 1,2-bis(ethylthio)ethane and 1,2-bis(propylthio)ethene are very suitable.

When a mondentate ligand is used, compounds having the following general formula are preferred:

$$R^7R^8R^9M^3 \qquad (IV)$$

wherein $M^3$ represents a phosphorus, arsenic or antimony atom, each of $R^7$, $R^8$ and $R^9$ independently represents a non-substituted or polar substituted hydrocarbyl group, such as n-alkyl groups and aryl groups, in particular phenyl groups. Eligible substituents are alkoxy groups, in particular having up to 5 carbon atoms, such as methoxy and ethoxy groups. Preferred monodentate ligands are tris(o-tolyl)phosphine, tris(2-methoxyphenyl)phosphine, trinaphthylphosphine and tris(n-butyl)phosphine.

The amount of bidentate ligand supplied may vary considerably, but is usually dependent on the amount of metal of Group VIII, present in the catalyst composition. Preferred amounts of bidentate ligands are in the range of 0.5 to 8, preferably in the range of 0.5 to 2 moles per gram atom of metal of Group VIII, unless the bidentate ligand is a nitrogen bidentate ligand, in which case the bidentate ligand is preferably present in an amount of from 0.5–200 and in particular 1–50 moles per gram atom of metal of Group VIII. The monodentate ligands are preferably present in an amount of from 0.5–50 and in particular 1–25 moles per gram atom of metal of Group VIII.

The performance of the catalyst composition may be improved by incorporating therein an organic oxidant promoter, such as a quinone. Preferred promoters are selected from the group consisting of benzoquinone, naphthoquinone and anthraquinone. The amount of promoter is advantageously in the range of 1–50, preferably in the range of 1 to 10 mole per gram atom of metal of Group VIII.

The amount of catalyst used in the process of the invention may vary between wide limits. As indicated above it is advantageous to employ the smallest quantity of catalyst composition possible in relation to the quantity of copolymer to be prepared. Recommended quantities of catalyst composition are in the range of $10^{-8}$ to $10^{-2}$, calculated as gram atoms of metal of Group VIII per mole of olefinically unsaturated compound to be copolymerized with carbon monoxide. Preferred quantities are in the range of $10^{-7}$ to $10^{-3}$ on the same basis.

It is advantageous to carry out the copolymerization process in the presence of a protic compound. An advantage of using a protic compound resides in further maintaining the polymerization rate at the initial level. Examples of protic compounds are acids (such as sulphonic acids, carboxylic acids and adducts of boric acid and glycols or salicylic acids), alcohols and water. The protic compounds have typically 15 or fewer carbon atoms, if any. Preferred acids are those having a pKa of less than 6, more preferably less than 4 and in particular less than 2, when measured in aqueous solution at 18° C. Preferred protic compounds are alcohols, such as primary, secondary and tertiary aliphatic alcohols and phenols. They may be mono-alcohols or polyols, such as glycols. Preferred alcohols are the lower alcohols, normally understood to be the mono-alcohols which are completely miscible with water, in particular methanol and ethanol.

The quantity of the protic compound employed may vary between wide ranges. Preferred quantities of acid are in the range of 0.5–200, in particular in the range of 1.0 to 50, more particularly in the range of 1.0–10 equivalents per gram atom of Group VIII metal. When the protic compound is an alcohol, in particular a lower alcohol, it may function in the copolymerization as a liquid diluent, if any is used, or it may be incorporated therein, for example in a quantity up to 50% by volume, in particular 5–30% by volume, relative to the total volume of the diluent.

Olefinically unsaturated compounds which can be used as monomers in the copolymerization process of the invention include compounds consisting exclusively of carbon and hydrogen or compounds which additionally comprise hetero atoms, such as unsaturated esters. Unsaturated hydrocarbons are preferred. Examples of suitable monomers are lower olefins, i.e. olefins containing from 2 to 6 carbon atoms, such as ethene, propene and butene-1, cyclic olefins such as cyclopentene, aromatic compounds, such as styrene and α-methylstyrene and vinyl esters, such as vinyl acetate and vinyl propionate. Preference is given to ethene and mixtures of ethene with another α-olefin, such as propene or butene-1.

Generally, the molar ratio of carbon monoxide and the olefinically unsaturated compound(s) is selected in the range of 1:5 to 5:1. Preferably the molar ratio is in the range of 1:1.5 to 1.5:1, substantially equimolar ratios being preferred most.

The copolymerization process of this invention is typically carried out in the presence of a liquid diluent, but it may also be carried out as a gas phase process. Preferably a liquid diluent is used in which the copolymer to be prepared forms a suspension, in which case a diluent may be selected in which the copolymer is insoluble or virtually insoluble. Examples of liquid diluents are ketones (e.g. acetone), chlorinated hydrocarbons (e.g. chloroform or dichloromethane), aromatics (e.g. toluene, benzene, chlorobenzene) and protic diluents, such as the lower alcohols (e.g. methanol and ethanol). Mixtures of liquid diluents may be used as well, for example protic diluents may comprise aprotic compounds. Particularly preferred are aromatic diluents and protic diluents because these provide a further improvement in maintaining the polymerization rate at the initial level.

When the process of this invention is carried out such that the prepared copolymer is formed as a suspension in a liquid diluent it is advantageous to have a solid particulate material suspended in the diluent before the monomers are contacted with the catalyst composition. This embodiment of the process is advantageous in that it provides a further improvement in maintaining the polymerization rate at the initial level. In this embodiment the catalyst is preferably used as a solution in the diluent. Alternatively it may be advantageous that a catalyst is used which is deposited on the solid particulate material or, otherwise, which is chemically bound to the solid particulate material. Catalysts of the latter type are known in the art, for example from EP-A-511713, EP-A-404228 and EP-A-619334.

Typically a copolymer of carbon monoxide and an olefinically unsaturated compound is used as the solid particulate material, in particular a copolymer which is based on the same mortcruets as the copolymer to be prepared. The latter means that, for example, when a linear alternating copolymer of carbon monoxide and ethene will be prepared a linear alternating copolymer of carbon monoxide and ethene from an earlier polymer preparation will be suspended in the diluent. Other suitable solid particulate materials may be inorganic or organic materials, such as silica, alumina, talc, soot and polymers, for example polyethene, polypropene and polystyrene.

The solid particulate material is suitably used in a quantity of 0.1–20 % w. relative to the weight of the diluent, more suitably in a quantity of 0.5–10 % w. The bulk density of the solid particulate material is typically in the range of 50–1000 kg/m$^3$, in particular in the range of 100–500 kg/m$^3$. The solid particulate material has typically an average particle size of $10^{-6}$–$10^{-3}$ m, in particular $10^{-6}$–$5\times10^{-4}$ m.

The average particle size is determined as follows. With the aid of a commercially available particle size analyser, a cumulative weight distribution of a representative sample of the solid particulate material is determined as a function of the particle size. The cumulative weight distribution function is converted into a cumulative surface area distribution function, as described by Terence Allen in *Particle Size Measurement* (Chapman and Hall, London, 1981), p. 122 ff. The average particle size is found as the median of the cumulative surface area distribution function.

If a liquid diluent is present in the copolymerization process it is advantageous to apply a stirring power transmitted to the polymerization mixture of at least 0.25 kW/m$^3$, in particular at least 0.5 kW/m$^3$. When the stirring power applied is less than 0.25 kW/m$^3$ there may be a depletion of monomer, in particular of carbon monoxide, in the liquid phase which may cause a decay of the rate of copolymerization. When a diluent is used in which the copolymer to be prepared forms a suspension it is advantageous to apply a stirring power of at least 0.5 kW/m$^3$, in particular at least 1.0 kW/m$^3$. A practicable maximum of the power density is 20 kW/m$^3$. A preferred range of the power density is from 1.5 to 15 kW/m$^3$. The stirring power may be transmitted to the polymerization mixture by any suitable means, for example, a stirring device, a jet mixer or a gas stream.

The copolymerization process is usually carried out at a temperature in the range of 20 to 200 C., preferably at a temperature in the range of 30 to 150 C. The reaction is conveniently performed at a pressure in the range of 2 to 200 bar, pressures in the range of 20 to 100 bar being preferred. The process is typically carried out at a scale at which the quantity of liquid diluent exceeds 10 kg. The process may be carried out as a batch process or as a continuous process. In the latter case it is advantageous to apply two or more reactors connected in series, because this increases the quantity of polymer which can be prepared within a given period of time using a certain reaction volume and a certain quantity of catalyst. Additional boron hydrocarbyl compound will be supplied to a subsequent reactor which is connected in series to the first reactor.

The copolymers obtained according to the invention are suitable as thermoplastics for fibres, films or sheets, or for injection moulding, compression moulding and blowing applications. They may be used for applications in the car industry, for the manufacture of packaging materials for food and drinks and for various uses in the domestic sphere.

The present finding that the catalyst activity can be restored by supplying boron hydrocarbyl compound can also be applied to a process for recycling the copolymerization catalyst. In this recycling process a Group VIII metal composition is recovered from a stream of a preceding polymerization process and fresh boron hydrocarbyl compound is added to obtain a catalyst composition which can be used in a subsequent copolymerization. The boron hydrocarbyl compound may be added prior to the recovery of the Group VIII metal composition in which case the Group VIII metal composition and the boron hydrocarbyl compound are recovered simultaneously. When the preceding copolymerization was a suspension process (i.e. the copolymer was formed in a diluent in which it is insoluble or virtually insoluble) the catalyst recovery can be accomplished by filtering the suspension. When the preceding copolymerization was carried out as a gas phase process the catalyst recovery may be accomplished by extracting the copolymer. Methods for catalyst recovery, including those which employ auxiliary chemicals, are known in the art, for example from EP-A-224304. At any stage of the recycling process a fresh Group VIII metal composition may be supplemented.

Accordingly, the present invention also relates to a process for recycling a polymerization catalyst comprising the steps of recovering a Group VIII metal composition from a preceding copolymerization process for the preparation of a copolymer of carbon monoxide and an olefinically unsaturated compound and adding a boron hydrocarbyl compound to the Group VIII metal composition.

The nature and the quantity of the boron hydrocarbyl compound added to Group VIII metal in this recycling process may be varied between wide limits. The nature and the quantity will generally be dependent of the polymerization process in which the recycled catalyst will subsequently be used. Guidelines thereto have been given hereinbefore.

The invention will be illustrated by the following non-limiting examples. The diluents were analytical grade chemicals, which were used as purchased.

EXAMPLE 1 (Comparative)

A copolymer of carbon monoxide with ethene and propene was prepared as follows. Tris(perfluorophenyl)borane (0.247 g, 0.48 mmoles) was weighed in air into a dried Schlenk tube and dissolved in 100 ml dichloromethane. The solution was transferred to a 300 ml autoclave equipped with baffles and an inclined blade stirrer. Subsequently 25 g propene was added. The autoclave was pressurised to 30 bar with premixed carbon monoxide and ethene (1:1 molar ratio). The stirring power applied was about 3 kW/m$^3$. The autoclave was heated to 70° C. $L_2Pd(CH_3CO_2)_2$ (0.0154 g, 0.025 mmoles), wherein $L_2$ denotes 1,3-bis (diphenylphosphino)propane, taken up in 10 ml dichloromethane was injected into the autoclave. The autoclave was pressurised with the carbon monoxide/ethene mixture to 50 bar and maintained at that pressure for 1 hour by supplying additional carbon monoxide/ethene mixture. The pressure was released and the autoclave was allowed to cool to room temperature.

The polymer product was recovered by filtration, washed with dichloromethane and dried.

Polymerization rates were calculated from the rate of addition of the carbon monoxide/ethene mixture. The initial polymerization rate was 10.7 kg copolymer/(g palladium.hour); the rate after 1 hour, i.e. prior to the release of pressure, was 1.0 kg copolymer/(g palladium.hour). Thus, the rate decay was 90%.

EXAMPLE 2 (Comparative)

A copolymer of carbon monoxide with ethene and propene was prepared following the procedures outlined in Example 1, with the differences that the copolymerization was not terminated after 1 hour, and that after one hour additional $L_2Pd(CH_3CO_2)_2$ (0.028 g, 0.047 mmoles), wherein $L_2$ denotes 1,3-bis(diphenylphosphino)propane, dissolved in 20 ml dichloromethane was injected into the autoclave. At the moment of the injection of additional $L_2Pd(CH_3CO_2)_2$ the polymerization rate was 0.1 kg copolymer/(g palladium.hour).

During the hour subsequent to the injection of additional $L_2Pd(CH_3CO_2)_2$ no increase, but only a further decrease of the polymerization rate was detected.

EXAMPLE 3

A copolymer of carbon monoxide with ethene and propene was prepared following the procedures outlined in Example 2, with the difference that after one hour additional tris(perfluorophenyl)borane (0.41 g, 0.8 mmoles) dissolved in 20 ml dichloromethane was injected into the autoclave, instead of a solution of $L_2Pd(CH_3CO_2)_2$. At the moment of the injection of additional tris(perfluorophenyl)borane the polymerization rate was 1.0 kg copolymer/(g palladium.hour).

After the injection of additional tris(perfluorophenyl) borane the polymerization rate increased within 20 minutes from 1.0 to 4.4 kg copolymer/(g palladium.hour) and in the subsequent 40 minutes the rate increased further to 5.0 kg copolymer/(g palladium.hour).

We claim:

1. A process for the copolymerization of carbon monoxide with an olefinically unsaturated compound comprising (a) contacting the monomers with a catalyst composition comprising a source of a Group VIII metal and a boron hydrocarbyl compound and (b) adding additional boron hydrocarbyl compound to the polymerization mixture during the copolymerization.

2. A process as claimed in claim 1, wherein the Group VIII metal is palladium and the boron hydrocarbyl compound is defined by the general formula BXYZ wherein X, Y and Z denote independently substituted or unsubstituted hydrocarbyl groups.

3. A process as claimed in claim 1, wherein the boron hydrocarbyl compound is used in a total quantity which is less than 0.2 moles boron per kg of copolymer to be prepared.

4. A process as claimed in claim 1, wherein a portion of the boron hydrocarbyl compound, is supplied at the start of the polymerization and the remainder is supplied in a later stage, in a continuous fashion or step wise.

5. A process as claimed in claim 1, carried out as a continuous process in two or more reactors connected in series and wherein additional boron hydrocarbyl compound is supplied to a subsequent reactor which is connected in series to a first reactor.

6. A process as claimed in claim 1, wherein an additional catalyst component is made of a bidentate ligand of the general formula $$R^1R^2M^1—R—M^2R^3R^4 \qquad (I)$$

wherein $M^1$ and $M^2$ independently represent a phosphorus, arsenic or antimony atom, $R^1$, $R^2$, $R^3$ and $R^4$ independently represent a non-substituted or polar substituted hydrocarbyl group, and wherein more of $R^1$, $R^2$, $R^3$ and $R^4$ represents an aryl group, and R is a bivalent organic bridging group having at least 2 carbon atoms in the bridge.

7. A process as claimed in claim 1, carried out in the additional presence of a protic compound having a pKa of less than 6 when measured in aqueous solution at 18° C., alcohols and water.

8. A process as claimed in claim 1, wherein the olefinically unsaturated compound is ethene or a mixture of ethene with another α-olefin, the molar ratio of carbon monoxide and the olefinically unsaturated compound(s) is in the range of 1:5 to 5:1, the quantity of catalyst composition is in the range of $10^{-8}$ to $10^{-2}$, calculated as gram atoms of metal of Group VIII per mole of olefinically unsaturated compound to be copolymerized, a temperature is selected in the range of 20° and 200° C., and a pressure is selected in the range of 2 and 200 bar.

9. A process as claimed in claim 1, wherein a liquid diluent is present and a stirring power is transmitted to the polymerization mixture of at least 0.25 kW/m$^3$.

10. A process as claimed in claim 9, wherein said diluent forms a suspension and that the stirring power transmitted to the polymerization mixture is at least 0.5 kW/m$^3$.

11. A process as claimed in claim 10, wherein a solid particulate material is suspended in the liquid diluent before the monomers are contacted with the catalyst composition.

12. A process as claimed in claim 9, wherein the liquid diluent is an aromatic diluent or a protic diluent.

13. A process for recycling a polymerization catalyst comprising the steps of recovering a Group VIII metal composition from a preceding copolymerization process for the preparation of a copolymer of carbon monoxide and an olefinically unsaturated compound and adding a boron hydrocarbyl compound to the Group VIII metal composition.

* * * * *